United States Patent [19]

Staadecker

[11] Patent Number: 5,599,866

[45] Date of Patent: Feb. 4, 1997

[54] METAL-CONTAINING LATEX PAINT

[76] Inventor: Bert Staadecker, 233 Streetsboro Rd., Hudson, Ohio 44236

[21] Appl. No.: 418,179

[22] Filed: Apr. 6, 1995

Related U.S. Application Data

[63] Continuation-in-part of Ser. No. 117,438, Sep. 7, 1993, abandoned.

[51] Int. Cl.$^6$ .................................................. C08K 9/10
[52] U.S. Cl. ...................... 524/440; 523/210; 524/785; 428/407; 428/570
[58] Field of Search ........................ 523/210; 524/440, 524/785; 428/407, 570

[56] References Cited

U.S. PATENT DOCUMENTS

| | | | |
|---|---|---|---|
| 3,725,285 | 4/1973 | Denk et al. | 252/62.54 |
| 3,878,121 | 4/1975 | Roche et al. | 428/402.24 |
| 4,069,164 | 1/1978 | Dezawa et al. | 252/62.62 |
| 4,243,417 | 1/1981 | Grourke et al. | 106/14.13 |
| 4,358,388 | 11/1982 | Daniel et al. | 252/62.54 |
| 4,608,401 | 8/1986 | Martin | 523/205 |
| 4,867,795 | 9/1989 | Ostertag et al. | 106/459 |

*Primary Examiner*—Paul R. Michl
*Assistant Examiner*—John J. Guarviello

[57] ABSTRACT

The invention relates to a surface coating composition comprising a latex-base paint having dispersed therein particles of a Group VIII metal, the metal rendering the surface coating composition capable of retaining a magnetized object, and to a method for making a paint composition comprising: preparing the paint composition; and dispersing in the prepared paint composition an amount of a Group VIII metal such that the ratio of the metal to the paint composition is from about 5 pounds to about 9 pounds metal to about 1 gallon paint, and finally to a method for hanging an article on a wall comprising: mixing a paint composition having Group VIII metal particles dispersed therein; applying the paint composition to the wall; affixing a magnet to the article; and, touching the article having the magnet affixed thereto to the wall. The invention also relates to a encapsulating means for iron particles comprising a paint composition containing an encapsulating agent.

11 Claims, No Drawings

METAL-CONTAINING LATEX PAINT

CROSS-REFERENCE TO RELATED APPLICATIONS

This application is a continuation-in-part application of U.S. Ser. No. 08/117,438, filed Sep. 7, 1993 abandoned.

FIELD OF THE INVENTION

The subject invention is related to a paint composition which contains a Group VIII metal powder and when applied to a surface is capable of accepting and retaining a magnetized article.

BACKGROUND OF THE INVENTION

It is known in the art to impart magnetic properties to paint compositions. Conventionally, this is accomplished by the addition of magnetic material to the paint. This is usually done using oil-base paint compositions because of the rust and degradation problems which may result from the addition of magnetic metal material to water-base or latex paint, which problems are compounded when the paint is exposed to the environment.

It has remained for the current invention to provide a method for creating a surface coating, or paint, which is receptive to magnetic articles, while not itself being magnetic. It has further remained for the subject invention to teach the foregoing coating in the form of a latex, or water-base, surface coating.

SUMMARY OF THE INVENTION

The invention relates to a surface coating composition comprising a latex-base paint having dispersed therein particles of a Group VIII metal, the metal rendering the surface coating composition capable of retaining a magnetized object, and to a method for making a paint composition comprising: preparing the paint composition; and dispersing in the prepared paint composition an amount of a Group VIII metal such that the ratio of the metal to the paint composition is from about 5 pounds to about 9 pounds metal to about 1 gallon paint, and finally to a method for hanging an article on a wall comprising: mixing a paint composition having Group VIII metal particles dispersed therein; applying the paint composition to the wall; affixing a magnet to the article; and, touching the article having the magnet affixed thereto to the wall. The invention also relates to a encapsulating means for iron particles comprising a paint composition containing an encapsulating agent.

DETAILED DESCRIPTION OF THE INVENTION

This invention relates to an iron-containing latex-base paint, or surface coating, which is free from rust or other metal degradation when exposed to ambient conditions, as when applied to a wall surface or when stored in a container. Further, the subject coating composition has a shelf life of at least six months, during which time the coating is free of problems relating to settling of the metal component out of solution.

In order to avoid problems of rusting or degradation of the metallic inclusion of the subject coating composition, the metal particles are encapsulated. Absent such encapsulation, metal particles such as iron would rust when contacted by the aqueous base of the subject composition, causing the coating to discolor and eventually to flake and spall.

The metallic component may be any metal of Group VIII of the Periodic Table, which in combination with a latex paint is capable of accepting and retaining a magnetic item when the magnetic item is placed in contact with the coating or paint. Preferably, the metallic component is added to the paint composition in the powdered or granular from. This is not to say, of course, that the physical configuration of the particles need be spherical, though it may be. Rather, it is important only that the particles are suitable for being encapsulated as specified herein. However, preferably the particles are generally spherical, as the use of platelets or flakes may result in a rough finish on the coated surface.

Particle size of the metallic component is preferably consistent with that of Grade B powders, roughly in the range of from about 140 mesh to about 325 mesh. The use of a larger particle size may cause a rougher painted surface than is usually desired by the user, though there are instances where a rough finish may be acceptable.

The metallic component, as mentioned above, may be any metal from Group VIII of the Periodic Table, or any blend of metals or alloy comprising metals from this Group. Preferably, the metal is iron. From about 5 to about 9 lbs. of iron powder can be used per gallon of paint solution. Preferably, the amount of iron used is about 6 lbs per gallon.

The paint composition to which the metal component is added is a latex, or water-base, paint. The polyurethane latex paint composition which is the subject hereof contains a number of additives, including antifreeze agents, defoaming agents, stabilizers, bactericides, rheology modifiers, fillers and corrosion inhibitors. Of course, as the paint is water-base, at least about 20% by weight of the final coating composition will be water. Even given the water-base nature of the coating, up to 2.5% by weight of the composition may be comprised of other solvents, such as propylene glycol and ester alcohol, such as that available from Eastman Chemical Company called Texanol Ester Alcohol. This ester alcohol component aids in the paint drying from the backside forward, and in low temperature application.

Suitable polyurethane resins include Acrysol RM 825 and Acrysol RM 1020, both of which are commercially available from Robin & Haas Company. The 825 resin is used for thickening the paint and the 1020 resin imparts high sheer viscosity to the paint, thus helping to keep the metal powder in suspension. These components are, therefore, used to modify the rheology of the paint composition.

The acrylic components of the subject composition include an acrylic latex and an acrylic polymer. The latex component is preferably a 100% acrylic emulsion which is highly durable. This emulsion has excellent resistance to chalking. An example of a suitable latex is Rhoplex AC-235 emulsion, available commercially from Rohm & Haas Co. The polymer material is an anionic aqueous dispersant made of acrylic polymers. This component is useful in dispersing the titanium oxide and clay filler components in aqueous systems. This polymer has a 30% solids level. An especially suitable polymer is Tamol 850, available commercially from Rohm & Haas Co., which has a very low foaming property, thereby reducing the need for large amounts of other commercial defoamers.

While the acrylic polymer acts as a dispersant, it may be necessary to incorporate yet other dispersing agents in the subject composition. An example of a suitable dispersing agent would be tetrapotassium pyrophosphate, available from Monsanto Chemicals Company as TKPP, Anhydrous.

As is stated hereinabove, sodium nitrite is added to the paint composition. This component performs several functions. It acts as an encapsulant, encapsulating the Group VIII metal particles. Therefore, it serves as a corrosion inhibitor, keeping the metal powder from rusting and causing degradation and discoloring of the paint. Suitable sodium nitrite compounds are available from General Chemical Corporation.

A titanium oxide compound can be added to the subject composition to act as a hiding agent, and to enhance the durability of the coating. A superior grade of titanium oxide for use in such compositions is that having up to 94% purity, though lesser purity compounds may be used. Tiona RCL-9, commercially available from SCM Corp., is an example of a suitable titanium oxide. Other titanium oxides having purity levels suitable to the end use of the product may also be used.

A glycol compound may be added to the composition as an anti-freeze to protect the paint below 32° F. Suitable glycols include propylene and ethylene glycol, and others commonly used in the paint industry.

Thickeners, or pigment extenders or fillers, as they are referred to in the industry, are incorporated into the paint composition to improve the viscosity characteristics of the paint, and also to perform other functions in the paint composition, such as defoaming, suspension, stabilizing and gloss reduction.

Some thickeners which may be added to further perform as suspending agents include cellulosic thickeners, such as Natrosol Plus 330, available from Aqualon, which provides an acceptable CPS. Also useful in this regard is Attagel 50, which is a hydrated aluminum magnesium silicate especially useful for enhancing paint thixotropy, stabilizing the composition, and enhancing suspension properties of the pigments in the composition. Attagel 50 is available commercially from Engelhard Corp.

Suspending agents are important to the subject composition in that it is important that the Group VIII metal particles be homogeneously dispersed throughout the paint. Even distribution of metal particles in the paint ensures that all parts of a surface coated with the paint will be capable of retaining a magnetized object.

Other thickeners which may be used contain defoamers. Such compounds include those containing a combination of aliphatic petroleum distillates and silica. The silica content of this component is responsible for the hydrophobic properties of the component. One such suitable defoamer is Drewpluss L475, available commercially from Drew Industrial Division. Other suitable defoamers include those based on the same CPS build, or based on isopropyl alcohol, such as Dehydran 1620.

Another conventional pigment extender is Alsibronz, 12, available commercially from Franklin Mineral Products, which is an extender pigment with a 99% purity level. This pigment has very low crystal and silica content and is used to give bulk per unit weight to the formula. Other extenders, like that described herein above, include any mica having a particle size and shape in keeping with the components described herein.

Another similar pigment extender which has other desirable properties is a silica or diatomacious earth component which, not unlike that mentioned above, has very low crystal and silica content. Such a component imparts a low gloss film to a painted surface, which is required in a primer for better top-coat adhesion. Diafil 575, available commercially from CR Minerals Corp., is a suitable extender which has low crystal and silica content, and therefore substantially reduces the gloss of the resulting pigments.

Non-ionic surfactants having 100% solids level can also be used in paint compositions such as that disclosed herein to aid in pigment dispersion and stability. A suitable surfactant is nonyl phenol surfactant, sold as Igepal CTA-639-W surfactant, available commercially from Rhone-Poulenc, or other non-ionic surfactants with 100% solids levels.

The subject paint may further contain an in-can preservative. Exemplary of such a preservative is Dowicil 75, available from Dow Chemical Company, though other in-can preservatives known to those skilled in the art could also be used. The Dowicil 75 imparts mildewcide properties to the subject composition. Other known fungicidal agents include Polyphase AF-1, which is an iodo-propynl butyl carbonate, available from Troy Chemical Company, and others which are similar thereto.

The pH of the subject composition is kept above neutral by the addition of ammonium hydroxide to the solution. The ammonium hydroxide component should be capable of maintaining a pH of above about 8.5. This aids in product stability by keeping the pH above neutral. One such ammonium hydroxide component common to the paint industry is Aqua-Ammonia, which is a 29% ammonia solution.

The subject invention will now be discussed with reference to production of a specific composition of the paint which the inventor considers to be his preferred embodiment. This is not, however, intended to be limitative of the invention. The full scope of the invention includes that taught by the specification and appended claims in its broadest sense as understood by one skilled in the art.

THE PREFERRED EMBODIMENT

In the following discussion, all percentages are given in terms of weight percent based on the total weight of the finished composition unless otherwise noted. Further, mixing and additions are done at ambient conditions unless otherwise specified.

To 100 lbs. of water, 3 lbs. of tetrapotassium pyrophosphate dispersing agent was added. After this addition, the sides of the mixer were rinsed with 2.5 lbs. of additional water and mixing was continued for about 5 minutes to obtain a solution of the components.

To this solution, 8 lbs. of propylene glycol and 0.4 lbs. of Natrosol Plus 330 hydroxyethyl cellulose were added. Again, the sides of the mixer were rinsed with 2.5 lbs. of water, after which the following are added: 2.5 lbs. Drewplus L475, 6.3 lbs. Tomol 850 acrylic polymer, 4.0 lbs. Igepal CTA-639-W surfactant, and 120.0 lbs. Tiona BCL-9 titanium oxide tint base.

At this point the mixer was turned to high speed to enhance the incorporation of 65.0 lbs. of filler material into the solution. Of the 65 lbs., 25 lbs. was Diafil 575 and 40.0 lbs. was Alsibronz 12. The mixer was again rinsed with 5.0 lbs. of water.

At this juncture, the mixer was operated at high speed for about 15 minutes at a temperature of about 130° F. This aids in complete dispersion of the pigments in the solution. The mixer was then operated at low speed while the water content of the solution was more than doubled, i.e. 125 lbs. water was added and 1.5 lbs. of hydrated aluminum-magnesium silicate Attagel 50 was added to aid as a suspending agent. The solution at this point in the mixing process was a dispersion paste.

The mixing unit was again turned to high speed as 600 lbs./100 gallons of iron pigment was added to the suspension along with 5.5 lbs. Polyphase AF-1 and 1.0 lb. Dowicil preservative. The solution was mixed at high speed to ensure even dispersion of the iron into the paste.

The paste was then transferred to a thindown tank and 33 lbs. of water, used to rinse the Cowles mixer, was added. The thindown tank mixer was operated at high speed and 15 lbs. of propylene glycol was added, followed by further mixing at high speed for 15 minutes. The mixer was maintained on high speed while 13 lbs. and 9 lbs., respectively, of polyurethane resin and non-ionic polyurethane emulsion were added to modify the rheology of the mixture. Mixing was continued for 15 minutes, and then the mixer was maintained on high speed throughout the remainder of the mixing operation. This mixing stage was finished out by the addition of 2.2 lbs. ammonium hydroxide and 15 lbs. of Texanol Ester Alcohol.

Next, in a separate mixer, to 20 lbs. water at a temperature of about 115° F., 16.5 lbs. sodium nitrite was slowly added with constant agitation. This mixer was then operated at low speed for 5 minutes after which this solution was added to the thindown mixer. Mixing was continued for 15 minutes and then 6.0 lbs. of silica/aliphatic petroleum distillate and 352.0 lbs. of acrylic latex were added.

Mixing was continued at high speed for 60 minutes to conclude coating preparation. Once the mixer was turned off, and the coating was allowed to sit, mixing was continued for 15 minute periods every 6 to 8 hours over the ensuing 24 hour period. It is acceptable to add water to the composition to adjust the viscosity, at up to 10.0 lbs/100 gallons.

Analysis of resulting composition showed that it contained 6% iron, 26% water, 40.6% acrylic latex resin and emulsion and 1% encapsulant, the remainder consisting of various additives as previously discussed.

Upon application to a surface, such as a wall, and after it is dry, the coating will accept and retain magnetic objects. The coating is preferably applied to the wall by roller, though it may be applied by brush. The finished coating has only a slight texture to the touch, and appears to be relatively smooth.

Exemplary of uses to which the coating is well suited are on the walls of children's playrooms, bedrooms, or classrooms where children can affix magnetic items to the wall. For instance, a scene with popular children's characters may be constructed, or a sequencing exercise with numbers or letters may be conducted as a learning aid. This is advantageous as it allows children to work at their own height level on a wall and increases potential work space.

On a different level, conference rooms or office walls may be coated, thereby making business graphs or information which would otherwise require posting on a cork board or a magnetic board capable of being adhered directly to the walls, thus eliminating the need for such boards which may tend to clutter wall surfaces.

In these or other uses, articles to be retained on the painted wall may be magnetized, such as by magnetic strips, pieces or backing, or free magnets may be placed on top of the article after placing the article on the wall surface.

Having described the invention, the following is claimed:

1. A surface coating composition comprising a latex-base paint having dispersed therein sodium nitrite encapsulated metal particles of a Group VIII metal, wherein the ratio of sodium nitrite:Group VIII metal is at least about 1:36 weight basis, said encapsulated metal rendering said surface coating composition capable of retaining a magnetized object.

2. The surface coating composition of claim 1 wherein said encapsulated Group VIII metal is iron.

3. The surface coating composition of claim 2 wherein said iron is in the form of Grade B iron powder.

4. The surface coating composition of claim 1 wherein said encapsulated Group VIII metal is homogeneously dispersed in said composition.

5. A rust-free metal-containing paint composition comprising a water-base resin composition containing thickeners, defoaming agents, dispersants, surfactants, pigments, preservatives, stabilizers, acrylic components, and coalescing agent, the improvement being the dispersion therein of sodium nitrite encapsulated Group VIII metal, wherein the ratio of sodium nitrite:Group VIII metal is at least about 1:36 weight basis, dispersed in a paint.

6. The paint composition of claim 5 wherein said Group VIII metal is iron.

7. The paint composition of claim 6 wherein said iron is in the form of a Grade B iron powder.

8. The paint composition of claim 5 wherein said paint is a polyurethane latex paint.

9. A method for making a paint composition comprising:
   preparing a latex-base paint composition; and
   dispersing in said prepared latex-base paint composition an amount of a Group VIII metal such that the ratio of said metal to said paint composition is from about 5 pounds to about 9 pounds metal to about 1 gallon paint, said metal being particulate in nature and being encapsulated with sodium nitrite at a level of 1:36 weight basis, ratio of sodium nitrite to Group VIII metal to maintain said latex-base paint composition rust-free.

10. The method of claim 9 wherein said Group VIII metal is iron.

11. The method of claim 9 wherein said metal is homogeneously dispersed throughout said paint composition.

\* \* \* \* \*